A. M. HALSTED.
Horse Hay Fork.
No. 46,664.
Patented March 7, 1865.
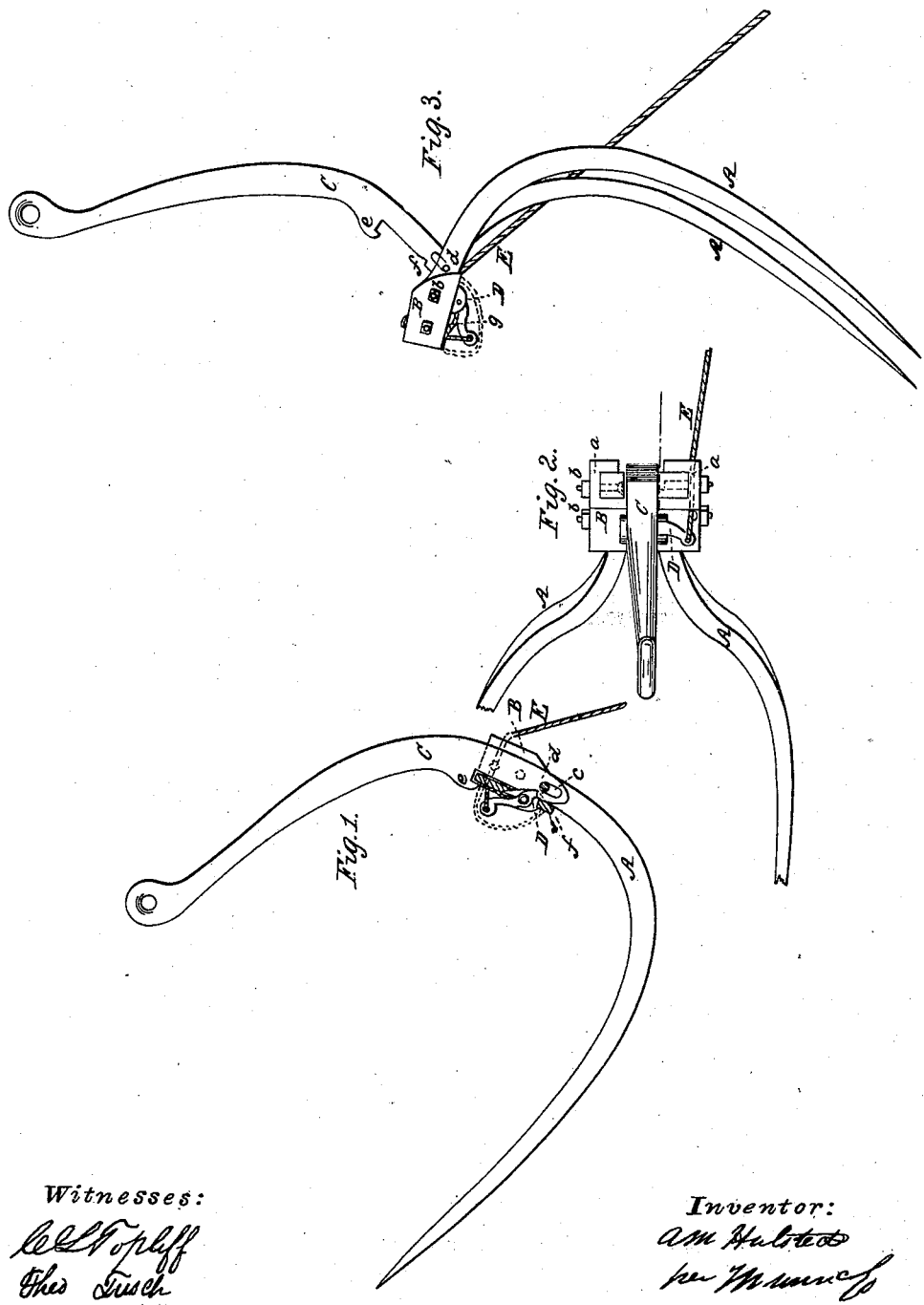

United States Patent Office.

A. M. HALSTED, OF RYE, NEW YORK.

IMPROVEMENT IN HORSE HAY-FORKS.

Specification forming part of Letters Patent No. 46,664, dated March 7, 1865.

*To all whom it may concern:*

Be it known that I, A. M. HALSTED, of Rye, in the county of Westchester and State of New York, have invented a new and Improved Horse Hay-Fork; and I do hereby declare that the following is a full, clear, and exact description thereof, which will enable those skilled in the art to make and use the same, reference being had to the accompanying drawings, forming part of this specification, in which—

Figure 1 is a side view of my invention, partly in section, and in a working position; Fig. 2, a plan or top view of the same; Fig. 3, a side view of the same in a tilted position after the load is discharged.

Similar letters of reference indicate corresponding parts.

This invention relates to a new and improved trip mechanism for a horse hay-fork—that is to say, a means whereby the fork is held in a position to retain its load while being elevated, and which will admit of being readily manipulated, so that the fork may discharge its load when required.

The object of the invention is to obtain a trip mechanism for a horse hay-fork which will be extremely simple in construction, capable of being operated with facility, and one which will be durable and not liable to be affected by wear.

The fork may be composed of two or more tines, A. A two-tined fork is represented in the drawings. These tines are bent or curved in the usual or any proper form, and they are secured at their upper ends in a head, B, of shell form, and having a groove, *a*, at the inner surfaces of two opposite sides, to receive the upper ends of the tines, the latter being secured in the head by bolts *b*. Between the upper ends of the tines A A, within the head B, there is a space in which the shank C of the fork is fitted. This shank is of curved form, as shown clearly in Fig. 1, and it has an oblong slot, *c*, made through it near its lower end, for a pivot-bolt, *d*, to pass through, said bolt passing through the tines A A. The shank C is formed with a lip or projection, *e*, at its front side, which, when the fork is loaded and being elevated, fits over the front upper edge of the head B, the head being prevented from sliding or slipping down in consequence of a catch, D, in the front part of the head fitting in a notch, *f*, in the front edge of the shank C. (See Fig. 1.)

The catch D is shown clearly in Fig. 1. It is simply a bent lever pivoted in the head B, and having a spring, *g*, bearing against it to keep the inner end in the notch *f*, a cord, E, being attached to the upper end of the catch, in order to release the head from the shank when necessary or desired, so that the former may slide or slip down and be free from the lip or projection *e* of the shank C, when the fork under its own gravity, in connection with that of the load, will immediately drop to the position shown in Fig. 3 and discharge its load. By this arrangement it will be seen that the pivot-bolt *d* is relieved from the weight of the load of the fork, said bolt sustaining the load only when the fork is turning or dropping, in order to discharge the latter.

In order to set the fork for hoisting a load, the shank and tines are brought around in a proper relative position with each other, and the head B shoved up or the shank C shoved down until the catch D enters the notch *f* and the lip or projection *e* fits over the upper edge of the head B.

The device is exceedingly simple and durable, there being no parts liable to get out of repair or become deranged by use.

The hoisting-rope is attached to the upper end of the shank C, and is arranged with the usual tackle to which the horse or draft-animal is attached.

I would remark that the outer part of the catch D may be covered by a cap, in order to protect the same from contact with surrounding objects and prevent a casual tilting of the fork and discharge of its load.

Having thus described my invention, I claim as new and desire to secure by Letters Patent—

A horse hay-fork provided with a shank, C, having an oblong slot, *c*, for the pivot-bolt *d*, which connects the shank with the tines, to pass through, in connection with the catch D in the head B and the lip or projection *e* on the shank, all arranged to operate in the manner substantially as and for the purpose set forth.

A. M. HALSTED.

Witnesses:
M. M. LIVINGSTON,
C. L. TOPLIFF.